March 21, 1967
A. E. HALA
3,310,651
INDUCTION HEATING APPARATUS FOR A LONGITUDINALLY
MOVING WORKPIECE
Filed May 11, 1964
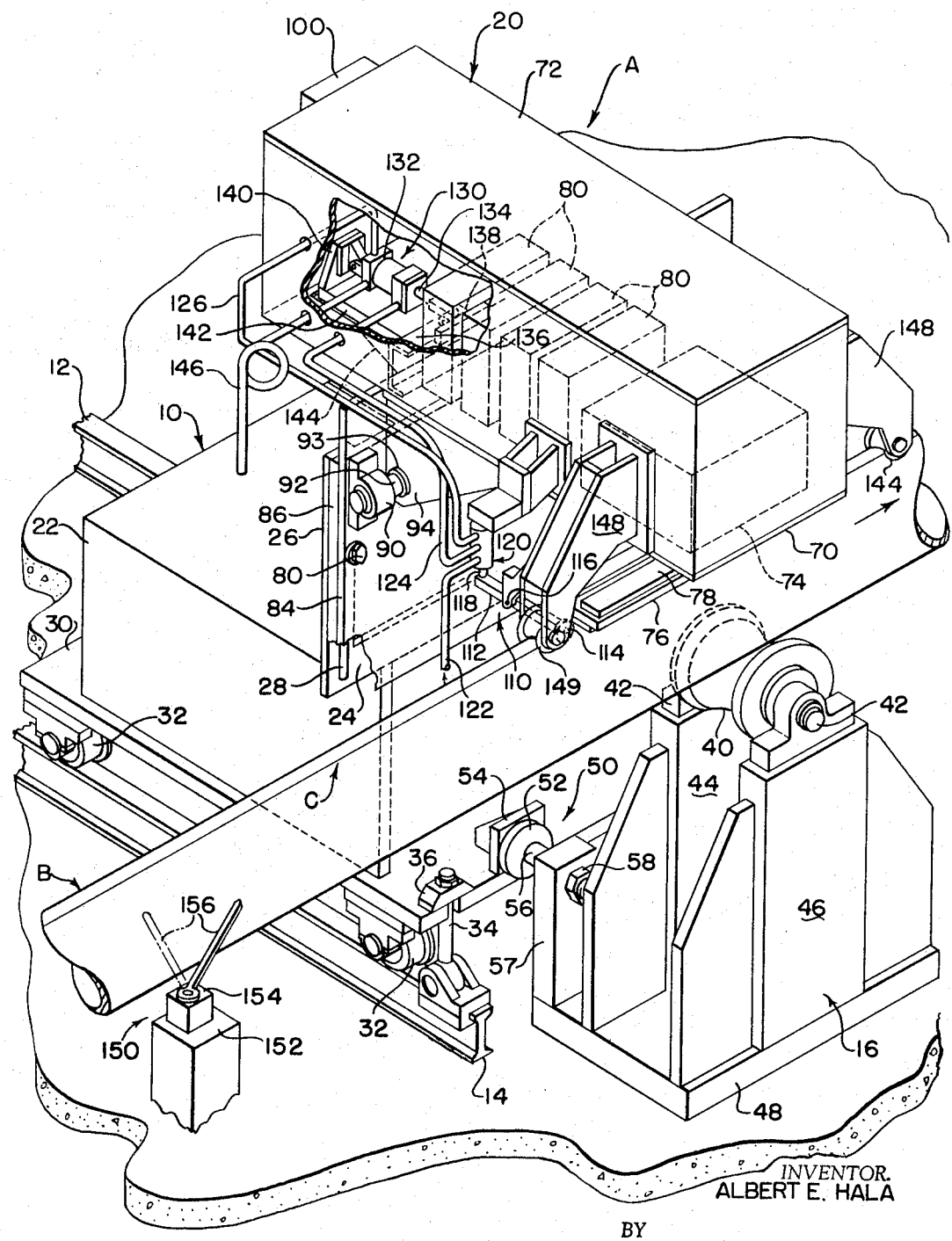
INVENTOR.
ALBERT E. HALA
BY
Tillberry & Body
ATTORNEYS

United States Patent Office 3,310,651
Patented Mar. 21, 1967

3,310,651
INDUCTION HEATING APPARATUS FOR A LONGITUDINALLY MOVING WORKPIECE
Albert E. Hala, Cleveland, Ohio, assignor to The Ohio Crankshaft Company, Cleveland, Ohio, a corporation of Ohio
Filed May 11, 1964, Ser. No. 366,526
6 Claims. (Cl. 219—8.5)

The present invention pertains to the art of induction heating and more particularly to an induction heating apparatus for heating a longitudinally moving workpiece.

This invention is particularly applicable to a post heat inductor for annealing the longitudinal seam of a pipe which has been previously welded together in a conventional tube mill and it will be described with particular reference thereto; however, it will be appreciated that the invention has much broader applications and may be used for heating various elongated workpieces, such as longitudinally moving metal tubing or metal strip.

Although the invention applies generically to elongated metal workpieces moving along a preselected path, the workpiece will be hereinafter referred to as a pipe for the purpose of simplifying the description of the invention.

Seam welded metal pipe is generally formed by an apparatus, usually referred to as a tube mill, wherein a flat metal strip, known as a skelp, is formed into a pipe by bringing the edges of the skelp together and then seam welding the edges to form the pipe. As the metal skelp is moving longitudinally through the tube mill, the edges gradually converge and an alternating current is caused to flow along the converging edges and across the point of convergence. In this manner, the converging edges are preheated and then raised to the welding temperature at which time they are welded together by appropriately positioned pressure rolls spaced around the tubularly formed skelp. A pipe formed in this fashion has a longitudinally extending seam. Since the seam is cooled rapidly after it is formed by pressure welding the edges, the metal in the pipe adjacent the seam often becomes somewhat brittle. For this reason, it is common practice to provide a post heat inductor above the longitudinally extending seam for annealing the previously hardened seam area of the pipe. This inductor must remain relatively close to the seam so that efficient magnetic coupling takes place between the inductor and the seam area of the pipe.

In the past, an expensive and relatively bulky apparatus has been provided for supporting the inductor above the pipe. This apparatus also included means for adjusting the spacing of the inductor from the pipe; however, this adjusting means did not have sufficiently rapid response to shift the inductor from the pipe when relatively high projections were formed on the seam. Consequently, these projections often damaged the inductor and required a substantial amount of down time in order to replace or repair the inductor. In addition, the previous, bulky apparatus for supporting the inductor above the pipe did not have a convenient arrangement for adjusting the inductor to accommodate pipes of varying sizes.

These and other disadvantages of the prior apparatus for supporting the post heat inductor above the longitudinally moving pipe issuing from a tube mill are overcome by the present invention which is directed toward an apparatus for mounting the post heat inductor wherein the inductor is automatically positioned above the seam within a predetermined range of distances between the pipe and the inductor.

In accordance with the present invention there is provided an apparatus for heating an elongated workpiece moving along a generally horizontal path, the apparatus comprises a frame member pivoted on an axis spaced from and generally parallel to the longitudinal path of the workpiece, an inductor extending from the frame member toward the workpiece and above the workpiece, a power supply for energizing the inductor to heat the workpiece adjacent the upper surface thereof, a sensing device for sensing the vertical height of the workpiece, a power means for pivoting the frame member about the axis and control means for operating the power means in accordance with the height of the workpiece to maintain the inductor within a preselected range of distances above the workpiece.

The primary object of the present invention is the provision of an apparatus for inductively heating an elongated workpiece moving along a generally longitudinal path which apparatus has a relatively low initial cost and is durable in operation.

Another object of the present invention is the provision of an apparatus for inductively heating an elongated workpiece moving along a generally longitudinal path which apparatus includes an inductor positioned abov the workpiece and means for automatically maintaining a close spacing between the inductor and the workpiece as the workpiece is moving past the inductor.

Another object of the present invention is the provision of an apparatus for inductively heating an elongated workpiece moving along a generally longitudinal path which apparatus is less bulky than prior apparatus for heating elongated, longitudinally moving workpieces.

Still an further object of the present invention is the provision of an apparatus for inductively heating an elongated workpiece moving along a generally longitudinal path which apparatus includes an inductor positioned amove the workpiece, means for automatically maintaining a close spacing between the inductor and the workpiece as the workpiece is moving past the inductor and mechanical means for raising the inductor when the workpiece has an unusually high vertical projection that could damage the closely spaced inductor.

These and other objects and advantages will become apparent from the following description used to illustrate the preferred embodiment of the invention as read in connection with the accompanying drawing in which the figure is a somewhat schematic pictorial view illustrating the preferred embodiment of the present invention.

Referring now to the drawing wherein the showings are for the purpose of illustrating a preferred embodiment of the invention only and not for the purpose of limiting same, the figure shows an apparatus A for inductively heating pipe B in the area adjacent the longitudinally extending seam C. The pipe B is moving longitudinally as indicated by the arrow in the figure and, in accordance with the preferred embodiment of the present invention, the pipe B has just progressed from the exit end of a tube mill wherein the pipe was formed into a tubular shape and the longitudinally extending seam C was formed in a conventional manner. When pipe is being formed in a tube mill, the longitudinal seam generally cools at a sufficiently high rate so that a certain amount of hardening occurs adjacent the seam; therefore, in accordance with the illustrated embodiment of the present invention, the apparatus A is used to anneal the seam area of pipe B. It is appreciated that the invention is equally applicable to other induction heating operations.

In accordance with the embodiment of the invention shown in the figure, the apparatus A includes a movable buggy 10 riding along rails 12, 14; a pipe support 16, for supporting the pipe in a vertical position; and, an induction heating head 20 which forms an important aspect of the present invention.

Referring now to buggy 10, there is included a boxlike frame 22 for supporting a cross bar 24 and a vertical strut 26 having elongated holes 28, for a purpose to be hereinafter described in detail. It is appreciated that there is a vertical strut 26 on each end of cross bar 24 and an appropriate cross support, similar to bar 24, is provided at the upper end of the vertical struts. Frame 22 is secured onto the upper surface of platform 30 which is mounted on wheels 32 so that the platform, and therefore the buggy 10 and heating head 20, can be moved along the rails 12, 14 toward and away from the pipe B. To secure the buggy in place on rails 12, 14 there is provided a pair of clamping tie rods 34 at each front corner of platform 30, only one of which is shown. The tie rods coact with lugs 36 to clamp the buggy 10 in place on rails 12, 14 in a position adjacent pipe B.

The pipe is supported vertically by support 16 which, in accordance with the illustrated embodiment of the present invention, includes a contoured support roller 40, positioned generally below head 20, and spaced journals 42 secured onto spaced parallel plates 44, 46. These plates are secured on base 48 so that the roller 40 is rigidly mounted beneath pipe B. At the side of support 16 facing buggy 10 there is provided an adjustable stop device 50 including a bearing block 52 supported on platform 30 by a support 54 and a stop rod 56 threadably journaled within support block 57 and locked in place with respect to the block by a lock nut 58. In operation, the extended length of stop rod 56 is adjusted so that the buggy 10 can be moved toward pipe B and located in the proper position with respect to the pipe. It is appreciated that the structural features so far described can be varied without departing from the intended spirit and scope of the present invention.

The primary aspect of the present invention is the heating head 20 which, in accordance with the preferred embodiment of the present invention, includes a support frame 70 having a power pack housing 72. In the housing 72 there is located a transformer 74 which is connected onto an inductor 76 positioned above seam C on pipe B. The inductor is supported with respect to frame 70 by any appropriate structure and iron laminations 78 are positioned around the inductor in accordance with known induction heating techniques. The transformer 74 is connected onto an appropriate power supply, such as a generator or oscillator, not shown, to energize inductor 76 so that the inductor, spaced slightly above seam C, can inductively heat the seam area of pipe B as the pipe moves longitudinally under the inductor. Also within the power pack housing 72 there is provided a plurality of capacitors 80 which are used with the transformer 74 for correcting the power factor of the electrical system used to energize the inductor. It is appreciated that the particular elements and components for energizing the inductor 76 do not form a part of the present invention and other elements and components can be used without departing from the intended spirit and scope of the present invention; however, the mounting of at least a portion of the electrical components of the power supply on the head 20 saves a considerable amount of space and simplifies the necessary electrical connections.

The heating head 20 is pivotally mounted so that the inductor 76 can be moved vertically with respect to pipe B. In accordance with the illustrated embodiment of the invention, there is provided a plate 84 with bearing plate 86 movable along struts 26 in a vertical direction. The plate 84 is locked in the proper vertical position by one or more bolts 88 adapted to extend from plate 84 through struts 26 by way of the elongated slot 28. Many arrangements can be utilized for adjusting the vertical height of the plate 84; for instance, a motor can be connected between the plate and frame 22 for adjusting the height after the bolts 88 have been loosened. Thereafter, the bolts 88 can be tightened to lock the plate in the adjusted vertical position. Also, a hand wheel with a rack and pinion between the struts 26 and the bearing plate 86 can be used for adjusting the vertical position of plate 84 after bolts 88 have been loosened.

Plate 84 is provided with two spaced journal blocks 90 (only one of which is shown) which rotatably support a pivot shaft 92 extending through bearing 93 of brackets 94 (only one of which is shown). Brackets 94 are rigidly connected onto support frame 70 so that the frame may be pivoted about shaft 92. As so far explained, the head 20 is pivoted about shaft 92 which forms a pivot axis substantially parallel to the pipe B. To somewhat counteract the weight of the transformer 74 and capacitor 80 mounted on frame 70, the head 20 is provided with a weight 100. The weight 100 has sufficient mass to shift the center of gravity of head 20 to the side of shaft 92 opposite the pipe B. In this manner, if no power were exerted on the head 20, the head would pivot backwardly away from the pipe B until the brackets 94 rests against plate 84. The use of weight 100 prevents the downward movement of inductor 76 toward the pipe when there is power failure of the systems to be hereinafter described in detail. It should be appreciated that weight 100 is not required when the design of head 20 inherently locates the center of gravity of the pivotally mounted head on the remote side of shaft 92.

To uniformly and efficiently heat the seam area of pipe B, the inductor 76 must be closely spaced from the seam C and the spacing must be maintained within preselected limits. In accordance with the preferred embodiment of the present invention, the inductor 76 is maintained within a preselected range of distances above seam C by an apparatus including a vertical height sensing means 110 having a bar 112 with a sensing roller 114 adapted to ride along the seam C of pipe B. The bar 112 is pivoted on fulcrum 116 and is adapted to actuate plunger 118 in a vertical direction according to the height of the seam C as sensed by the roller 114. The plunger 118 is adapted to control the operation of hydraulic control valve 120 having a hydraulic fluid inlet line 122, a control line 124 to raise the inductor 76 when the seam increases in height and a control line 126 for lowering the inductor 76 when the seam decreases in height. In accordance with the preferred embodiment of the invention, hydraulic fluid is utilized for controlling the movement of head 20 toward and away from the pipe B; however, a variety of other fluid could be used or electrical and mechanical means could be substituted without departing from the intended spirit and scope of the present invention.

The head 20 is pivoted around shaft 92 by a power means 130 so that the vertical position of inductor 76 is accurately controlled in accordance with the height of seam C as sensed by sensing means 110. The power means 130 includes a cylinder element 132 and a rod 134 connected to an internal piston, in accordance with normal practice. The rod is connected onto bracket 136 of frame 70 by a clevis 138. Cylinder 132 is supported by bracket 140 on a fixed plate 142 which, in turn, is mounted by bracket 144 onto the plate 84. Cylinder 132 has inlet connections for lines 124, 126 and an inlet for line 146. This latter mentioned line is connected to an appropriate source of pressurized hydraulic fluid which tends to counteract the weight of head 20 so that the control of power means 130 can be accomplished with a relatively small change in force exerted between the cylinder and the internal piston.

Brackets 148 extend outwardly from each side of head 20 and they support rollers 149 positioned directly above the pipe. These rollers provide a mechanical override for the hydraulic system so that any extremely large vertical projection on the pipe will raise the head 20 from the pipe. Also, if the hydraulic system becomes somewhat inoperative, the rollers 149 prevent the inductor from being forced downwardly against the pipe. It is appreciated, in most instances the rollers 149 are not riding along the pipe and, in accordance with the preferred embodiment of the invention, they form only an overriding mechanical arrangement for the hydraulic control system as so far described.

In operation, the roller 114 senses the vertical height of the seam C and if the height changes upwardly, a fluid pressure is exerted through lines 124 to raise the inductor 76. In like manner, if the roller 114 senses a lowering of the seam C, a fluid pressure is exerted within line 126 to lower the inductor toward the pipe in a controlled manner.

It is desirable to raise the inductor from the pipe after the pipe has passed through the apparatus A; therefore, there is provided, in accordance with the preferred embodiment of the present invention, a device 150 for sensing the end of pipe B. The device 150 includes a support base 152 having a control box 154 supported thereon. A feeler 156 is adapted to extend from the control box to the pipe B so that the control box is energized when the feeler moves to the dashed line as shown in the figure. In this dashed line position, the control box actuates a control device, not shown, to decrease the pressure of the fluid in the counter balancing line 146 so that the head 20 is moved upwardly away from the pipe B.

It is within the contemplation of the present invention to control the spacing of the inductor 76 from pipe B by the rollers 149. In this situation, the line 146 applies a slight biasing force on head 20 so that the rollers can control the spacing. If there is a failure in the pressure of the fluid in line 146, the weight 100 will raise the inductor from the pipe.

It has been found that the apparatus A is highly successful in operation and provides an economical and easily controlled arrangement for post heating the longitudinally extending seam of a welded pipe. Various changes may be made in the preferred embodiment of the present invention without departing from the intended spirit and scope of the present invention as defined in the appended claims.

Having thus described my invention, I claim:

1. An apparatus for heating an elongated workpiece moving along a generally longitudinal path, said apparatus comprising a frame member pivoted on an axis spaced from and generally parallel to said longitudinal path, an inductor secured onto said frame and extending from said frame member toward said workpiece and above said workpiece, a power supply for energizing said inductor to heat said workpiece adjacent the upper surface thereof, a sensing device for sensing the vertical height of said workpiece, power means for pivoting said frame member about said axis and control means for operating said power means in accordance with the sensed height of said workpiece to maintain said inductor within a preselected range of distances above said workpiece.

2. An apparatus for heating the longitudinal seam of a welded pipe moving along a generally longitudinal path, said apparatus comprising a frame member pivoted on an axis spaced from and generally parallel to said longitudinal path, an inductor extending from said frame member toward said pipe and above said seam, a power supply for energizing said inductor to heat said pipe adjacent said seam, means for maintaining a preselected spacing between said inductor and said pipe, said means including a roller mounted on said frame and adapted to contact said pipe in the vicinity of said seam.

3. An apparatus for heating an elongated workpiece moving along a generally longitudinal path, said apparatus comprising a frame member pivoted on an axis spaced from and generally parallel to said longitudinal path, an inductor extending from said frame member toward said workpiece and above said workpiece, a power supply for energizing said inductor to heat said workpiece adjacent the upper surface thereof, a sensing device for sensing the vertical height of said workpiece, power means for pivoting said frame member about said axis, control means for operating said power means in accordance with the height of said workpiece to maintain said inductor within a preselected range of distances above said workpiece, and said power means being a fluid operated piston element within a cylinder element with one of said elements connected to said pivotable frame member and the other element connected to a relatively fixed member, and said sensing device including a fluid control valve for controlling fluid flow to said cylinder element in accordance with the height of said workpiece.

4. An apparatus for heating an elongated workpiece moving along a generally longitudinal path, said apparatus comprising a frame member pivoted on an axis spaced from and generally parallel to said longitudinal path, an inductor extending from said frame member toward said workpiece and above said workpiece, a power supply for energizing said inductor to heat said workpiece adjacent the upper surface thereof, a sensing device for sensing the vertical height of said workpiece, power means for pivoting said frame member about said axis, control means for operating said power means in accordance with the height of said workpiece to maintain said inductor within a preselected range of distances above said workpiece, a bracket secured onto said frame member in the vicinity of said workpiece and a roller mounted onto said bracket and extending toward said workpiece whereby said roller will raise said frame member from said workpiece when a high projection extends vertically from said workpiece.

5. An apparatus for heating an elongated workpiece moving a long a generally longitudinal path, said apparatus comprising a frame member pivoted on an axis spaced from and generally parallel to said longitudinal path, an inductor extending from said frame member toward said workpiece and above said workpiece, a power supply for energizing said inductor to heat said workpiece adjacent the upper surface thereof, a sensing device for sensing the vertical height of said workpiece, power means for pivoting said frame member about said axis, and control means for operating said power means in accordance with the height of said workpiece to maintain said inductor within a preselected range of distances above said workpiece, said frame having a center of gravity on the side of said pivot axis remote from said workpiece whereby said frame member will pivot away from said workpiece upon failure of said power means.

6. An apparatus for heating an elongated workpiece moving along a generally longitudinal path, said apparatus comprising a frame member pivoted on an axis spaced from and generally parallel to said longitudinal path, an inductor extending from said frame member toward said workpiece and above said workpiece, a power supply for energizing said inductor to heat said workpiece adjacent the upper surface thereof, a sensing device for sensing the vertical height of said workpiece, power means for pivoting said frame member about said axis, and control means for operating said power means in accordance with the height of said workpiece to maintain said inductor within a preselected range of distances above said workpiece, said frame member being counter balanced to minimize the force necessary to pivot said frame member about said axis.

References Cited by the Examiner
UNITED STATES PATENTS

| | | | |
|---|---|---|---|
| 2,582,955 | 1/1952 | Body | 219—9.5 X |
| 2,829,941 | 4/1958 | Laubscher | 219—10.69 X |
| 3,133,179 | 5/1964 | Armstrong et al. | 219—10.69 |
| 3,265,378 | 8/1966 | Grube et al. | 219—8.5 X |

FOREIGN PATENTS 620,432  3/1949  Great Britain.

RICHARD M. WOOD, *Primary Examiner.*

L. H. BENDER, *Assistant Examiner.*